United States Patent [19]

Stuart

[11] Patent Number: 5,348,465

[45] Date of Patent: * Sep. 20, 1994

[54] APPARATUS FOR PRODUCING PELLETS FROM FILM

[75] Inventor: James L. Stuart, Booneville, Ind.

[73] Assignee: Replas Incorporated, Evansville, Ind.

[ * ] Notice: The portion of the term of this patent subsequent to Aug. 18, 2009 has been disclaimed.

[21] Appl. No.: 945,017

[22] Filed: Sep. 15, 1992

Related U.S. Application Data

[60] Continuation-in-part of Ser. No. 890,917, May 29, 1992, which is a division of Ser. No. 674,164, Mar. 25, 1991, Pat. No. 5,139,403.

[51] Int. Cl.⁵ .......................... B29B 9/02; B29C 53/14
[52] U.S. Cl. ...................... 425/505; 264/103; 264/339; 425/302.1; 425/391; 425/508; 425/514
[58] Field of Search ................. 264/37, 103, 143, 140, 264/147, 151, 241, 295, 339, DIG. 69; 425/302.1, 308, 315, 319, 391, 402, 505, 508, 514; 156/148

[56] References Cited

U.S. PATENT DOCUMENTS

3,039,908  6/1962  Parmele ........................... 156/166
3,164,069  1/1965  Wilkie et al. ..................... 425/391
3,509,797  5/1970  Johnson ........................... 425/308
3,509,798  5/1970  Johnson ........................... 425/514
4,009,235  2/1977  Bober ............................. 425/391
4,164,530  8/1979  Renjilian et al. .................. 264/103
5,139,403  8/1992  Stuart ............................ 425/391

Primary Examiner—James Mackey
Attorney, Agent, or Firm—Woodard, Emhardt, Naughton, Moriarty & McNett

[57] ABSTRACT

A device for producing pellets from film. A cradle is rotatably mounted about a longitudinal axis of rotation to a main frame. All axle arranged perpendicular to tim longitudinal axis holds a roll of film within the cradle. A second roll of film is mounted outside of the cradle, is held by a second axle arranged perpendicular to the longitudinal axis of the cradle, and is fed into the cradle to a position adjacent and parallel to film unwound from the first roll. A plurality of drive rollers pull the film from the rolls while the rolls are rotated about the longitudinal axes twisting the film into a strand. An oven located between the rolls and drive rollers heats the strand to permanently set the twist therein. A pelletizer located aft of the drive rollers cuts the strand into individual pellets. In a modified version, the second roll is split into multiple sheets prior to entering the cradle by one or more film splitters.

12 Claims, 9 Drawing Sheets

Fig.9 an oven 21. Drive means 22 positioned between oven 21 and pelletizer 23 is operable to pull the material from winder 20 through oven 21. The pelletizer 23 is of a conventional design and is operable to cut the strand into pellets.

APPARATUS FOR PRODUCING PELLETS FROM FILM

This is a continuation-in-part patent application of U.S. Pat. application Ser. No. 07/890,917, filed May 29, 1992, now pending which is a divisional application of U.S. Pat. application Ser. No. 07/674,164, filed Mar. 25, 1991, now U.S. Pat. No. 5,139,403.

BACKGROUND OF THE INVENTION

1. Field of the Invention

This invention is in the field of plastic film processing.

2. Description of the Prior Art

There is a continual need for reprocessing plastic film which has been rejected for various reasons for its intended use. In many cases, the film is reprocessed into a pellet form so as to be compatible with the handling requirements of molding and/or extrusion. A process known as "densifying" has existed for many years and has been the accepted method to convert film into a pellet-like form. The current densification process has several disadvantages. For example, the film must be cut off from fiberboard cores and hand fed into a machine. The process of removing film from a fiberboard core as well as operation of the machine requires a level of manual labor and thus the quality of the finished product will vary between operators. Further, the densification process requires relatively high energy input to force the film through the machine. In many cases, the finished pellets are not uniform in size or shape causing feed or processing problems in certain molding machines or extruders. and the pellets are frequently wet since water must be sprayed into the machine to act as a coolant onto the molten polymer. Likewise, the quality of the pellets vary since the shear that occurs during the densification process often alters the polymer melt flow.

In view of these disadvantages, I have developed a new device and method of converting rolls of film into a more usable form. Disclosed herein is such a device and method which provides a product of superior quality and consistency while still being economical as compared to the prior method. More specifically, I have eliminated the manual labor of cutting film off of fiberboard cores and instead utilize rolls of film which are twisted into a pelletized strand. The method disclosed herein does not require a coolant liquid nor the high energy requirements of the densification process. Further, the melt flow or melt index of the polymer being processed is not altered with the output product being uniform in size, shape, melt and without moisture.

In a non-related product, applicant has noted plastic stir sticks, typically used for stirring drinks, are produced from plastic and have a rod shaped main body.

SUMMARY OF THE INVENTION

One embodiment of the present invention is a device for producing pellets from film including a holder operable to rotatably hold a first roll of film with a longitudinal axis and allow the film to be unwound therefrom. A second holder is operable to rotatably hold a second roll of film with a longitudinal axis and allow the film to be unwound therefrom. Film from the second roll is fed through a guide to a position adjacent and then parallel to film unwound from the first roll. A twister is provided which is operable to twist the film from the first roll about the film from the second roll into a strand. A heater is operable to heat the strand. A driver is engagable with the strand and is operable to move the strand through the heater, and, a pelletizer receives the strand and is operable to pelletize same.

Another embodiment of the present invention includes a splitter to cut film as it is unwound from the second roll. The splitter provides for feeding multiple sheets of film through a guide to a position adjacent and parallel to film unwound from the first film roll.

It is an object of the present invention to provide a device and method for changing film into strand or pellets.

A further object of the present invention is to provide a device and method for salvaging plastic film.

Related objects and advantages will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of tile principles of tile invention as illustrated therein being contemplated as would normally occur to one skilled in the art to which the invention relates.

Figure 1:
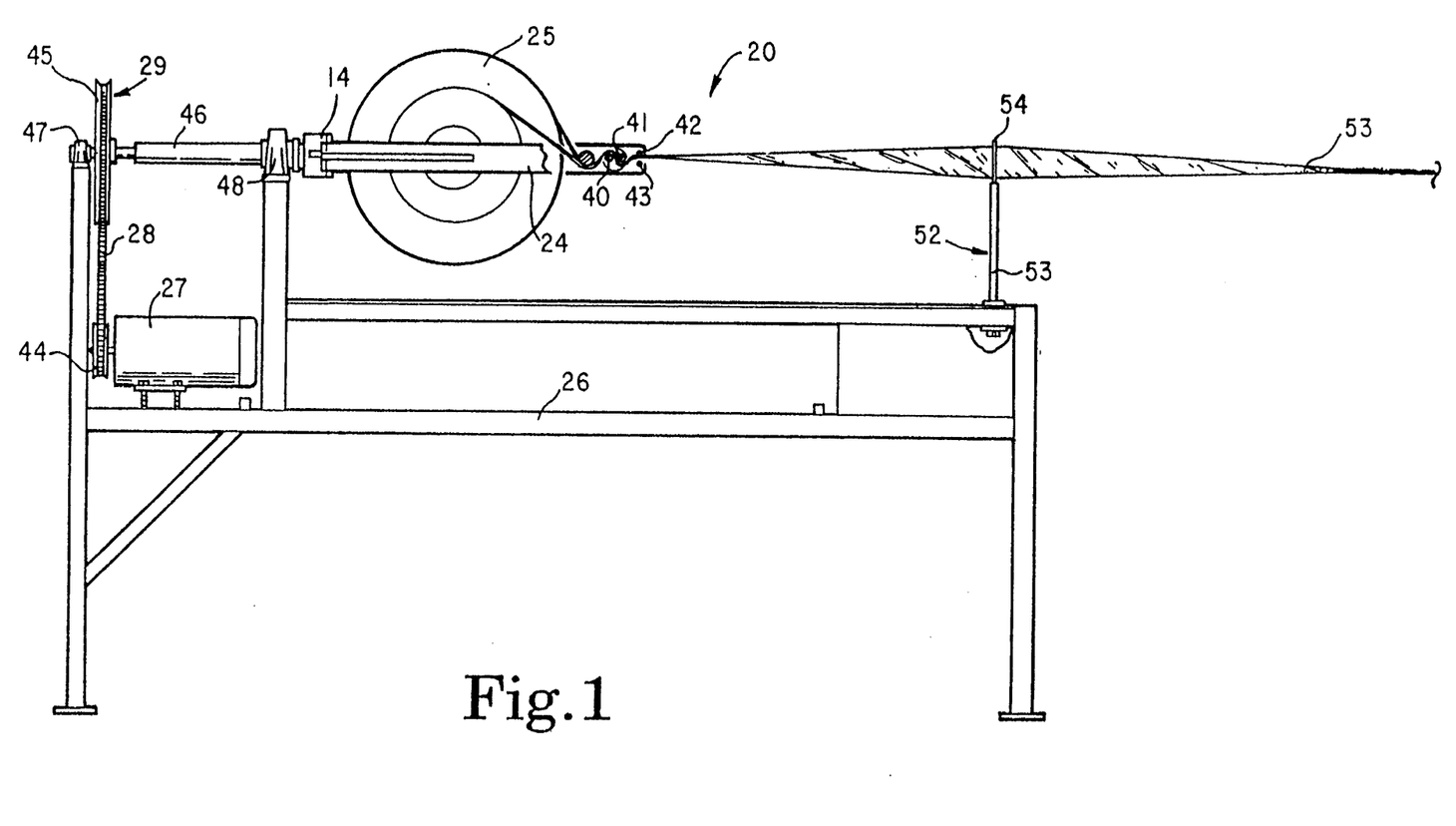
FIG. 1 is a fragmentary side view of the cradle and winding mechanism.
Figure 2:
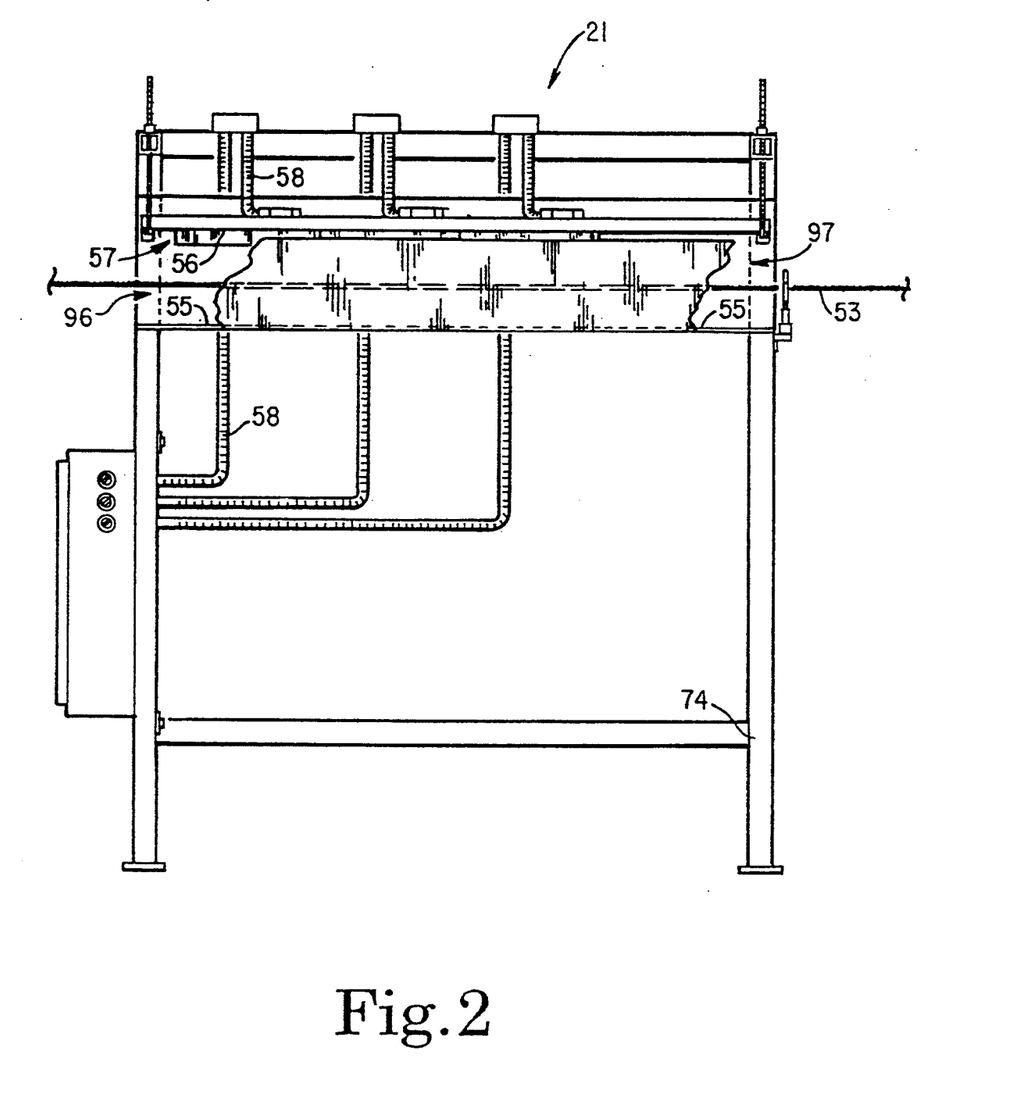
FIG. 2 is a fragmentary side view of the oven.
Figure 3:
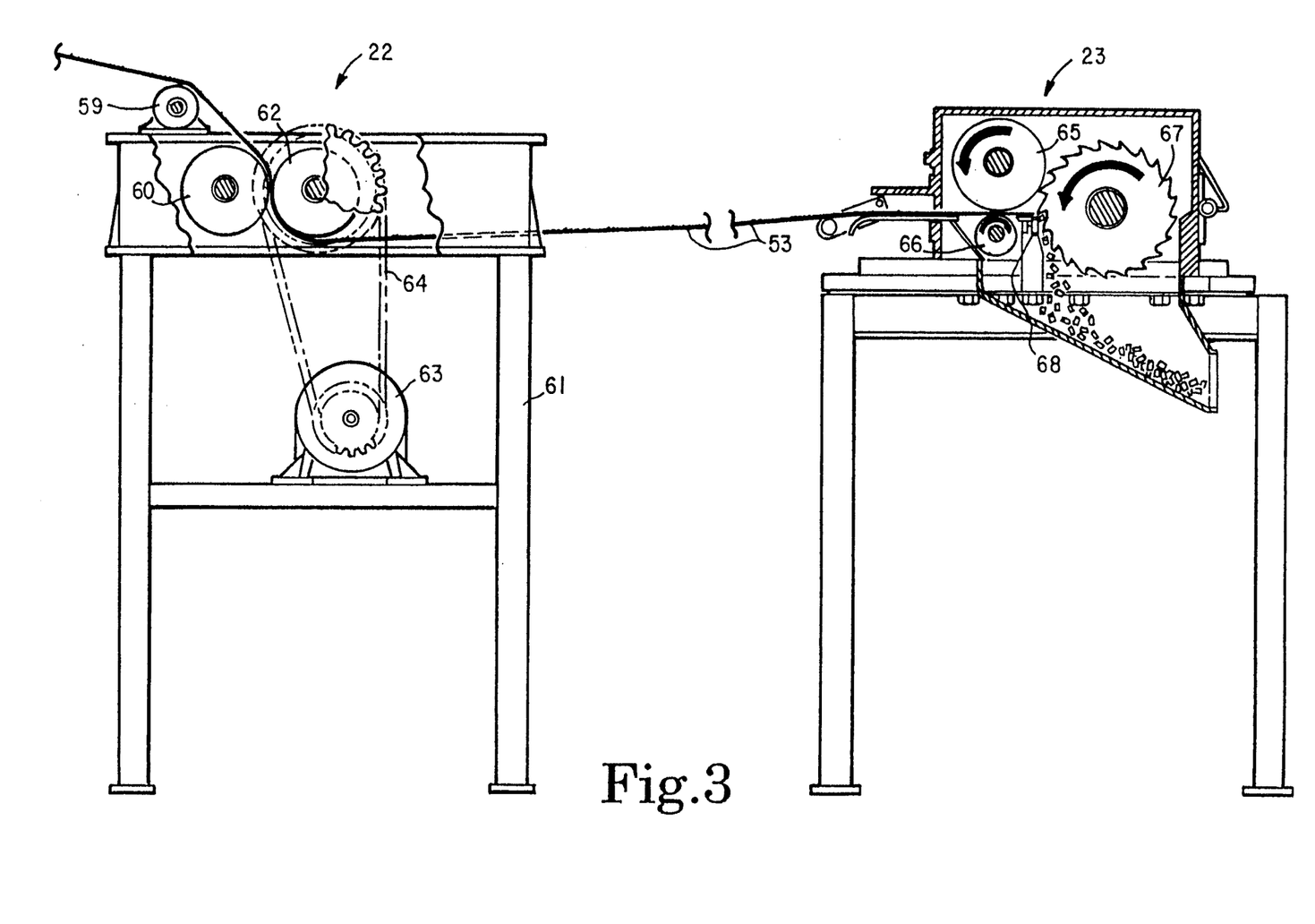
FIG. 3 is a fragmentary side view of the driver and pelletizer.

Referring now more particularly to FIGS. 1, 2 and 3, there is shown an alternate embodiment of the device incorporating the present invention. The device includes a winder 20, oven 21, drive means 22, and pelletizer 23. The four components are aligned along a longitudinal axis. Winder 20 is operable to unwind material from a roll and then direct the resulting strand through an oven 21. Drive means 22 positioned between oven 21 and pelletizer 23 is operable to pull the material from winder 20 through oven 21. The pelletizer 23 is of a conventional design and is operable to cut the strand into pellets.

Winder 20 has a holder or cradle 24 for holding the roll 25 of material to be unwound. Folder 24 is rotatably mounted to a frame 26 and is rotatably driven by a twisting means including a conventional motor 27 connected by a belt 28 and pulley wheel 29 combination connected to holder 24.

Figure 4:
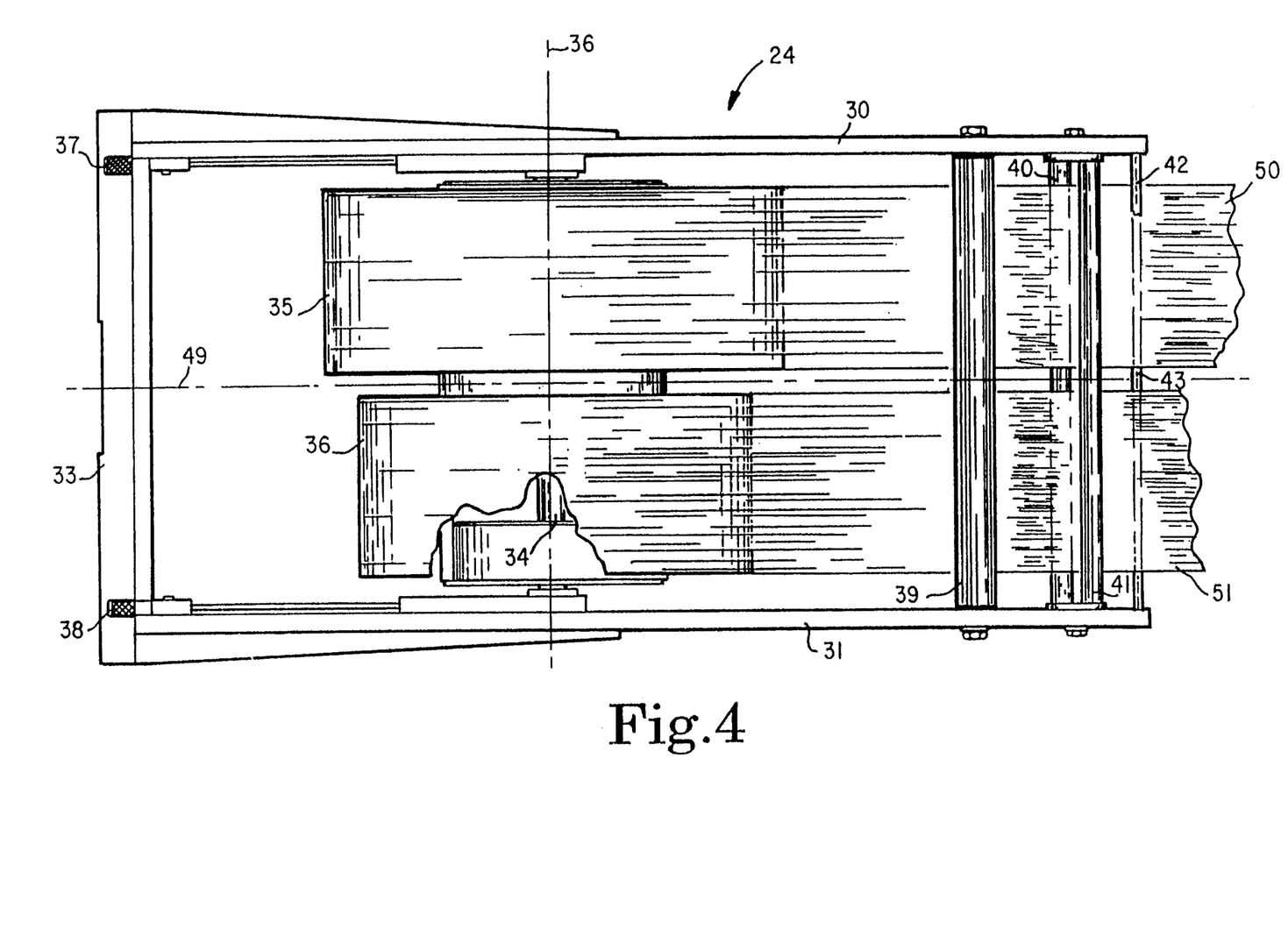
FIG. 4 is a top view of the cradle of FIG. 1.

A top view of holder 24 is shown in FIG. 4 and includes a pair of sidewalls 30 and 31 mounted to an end plate 33 in turn fixedly secured to a mounting block 14 (FIG. 1). An axle 34 is rotatably mounted to and between members 30 and 31 for holding one or more rolls of film or material. In FIG. 4, axle 34, is shown holding a first roll 35 and a second roll 36 in adjacent fashion so that both mils have the same longitudinal axis 36. A pair of axle bolts 37 and 38 are mounted to members 30 and 31 and hold captive axle 34. Both axle bolts 37 and 38 extend from end plate 33 toward the longitudinal axis 36 of axle 34. Members 30 and 31 include a pair of outwardly opening slots (not shown) into which axle 34 is rotatably mounted. Fasteners 37 and 38 close the outwardly opening slots to hold captive therein axle 34. Thus, by moving fasteners 37 and 38 away from axis 36, axle 34 may be removed from members 30 and 31 to allow new rolls to be mounted to the axle. A guide roller 39 (FIG. 4) is mounted to and between members 30 and 31. Likewise, a pair of tension bars 40 and 41 are mounted to and extend between members 30 and 31. Mounted to the distal end of members 30 and 31 are a pair of guide bars 42 and 43 (FIG. 1).

Electric motor 27 (FIG. 1) is operable to rotate its output pulley 44 in turn moving belt 28. Motion of belt 28 results in the rotation of pulley wheel 45 fixedly mounted to cradle shaft 46 rotatably mounted by a pair of bearings 47 and 48 to frame 26. Mounting block 14 is fixedly fastened to shaft 46 and therefore rotates along with cradle 24 as motor 27 rotates cradle shaft 46. The axis of rotation 49 (FIG. 4) extends centrally and longitudinally on holder 24.

The free end of the film or material wound on rolls 35 and 36 is pulled adjacent guide roller 39 and then fed between tension bars 40 and 41 and between guide bars 42 and 43. The film or sheet material 50 exiting from the cradle from roll 35 is essentially co-planar with the film or sheet material 51 exiting the cradle from roll 36. Rotation of cradle 24 by motor 27 via shaft 46 results in the twisting together of the film or sheet materials 50 and 51 into a single strand. A film support 52 is fixedly mounted to frame 26 (FIG. 1). Film support includes an upwardly extending post 53 having a ring 54 fixedly mounted thereatop. The inside diameter of ring 54 is sufficient to allow both films or sheet materials 50 and 51 to pass therethrough as they are wound into a strand 53.

Oven 21 includes a frame 74 upon which are mounted a pair of spaced apart walls or supports 55 and 56 defining a passage 96 through which strand 53 is pulled. Wall 56 includes a plurality of radiant heaters 57 connected via cables 58 to a source of electrical energy. Radiant heaters 57 are positioned on the downwardly facing surface of wall 56 thereby exposing strand 53 to heat as the strand is pulled through passage 96.

Drive means 22 is located aft of oven 21 and includes a pair of guide rolls 59 and 60 rotatably mounted to the driver main frame 61. A third roll 62 is rotatably mounted to the frame and is driven by a conventional electric motor 63 connected to the roll by means of a sprocket chain combination 64. Driver 22 is operable to pull the film or sheet material from the rolls rotatably mounted to the cradle as the cradle is also rotated along axis 49 (FIG. 4). Likewise, the driver pulls the resultant strand through the oven with the strand eventually exiting driver 22 and entering a conventional pelletizer 23 (FIG. 3). A variety of commercially available pelletizers are available. One such pelletizer is available from Conair Jetro, Bay City, MI. The pelletizer shown in FIG. 3 is fragmented to illustrate strand 53 passing between an upper feed roll 65 and a lower feed roll 66 to a helix angle rotor 67 which is operable to cut the strand on a bed knife 68 with the resultant pellets falling into a discharge chute. The pelletizer should be spaced apart from the oven a distance to allow the strand to cool before entering the pelletizer. Alternately, fans may be used to cool the strand or the strand may be directed via a plurality of guides along a non-direct route before entering the pelletizer.

Figure 5:
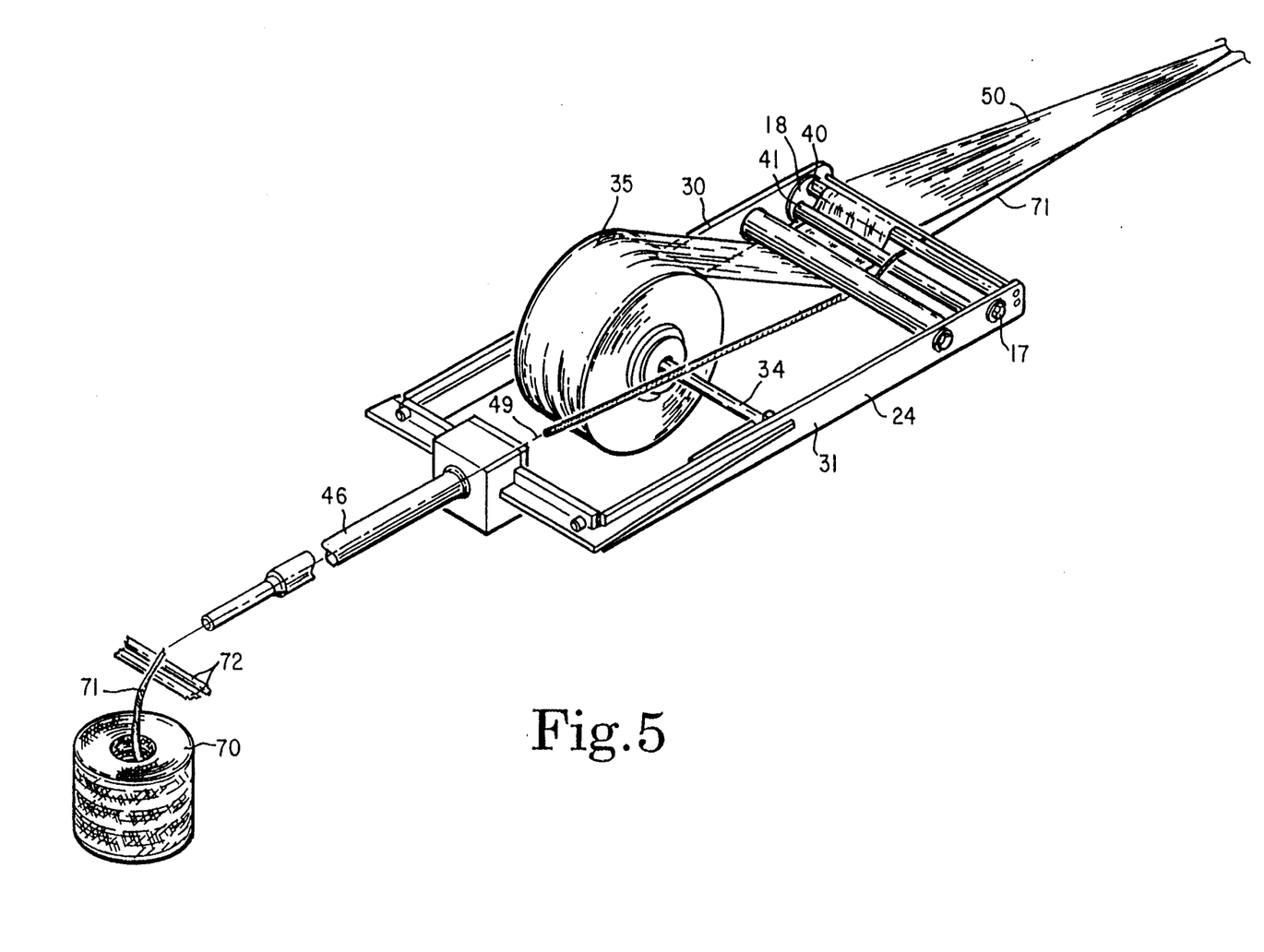
FIG. 5 is a perspective view of a modified version of the cradle of FIG. 4.

A modification of the design shown in FIGS. 1–4 is depicted in FIG. 5 and is provided to twist plastic film around a glass strand. The embodiment of FIG. 5 is identical to that previously described with the exception that a glass strand 71 is drawn through cradle 24. Thus, film roll 35 is rotatably mounted to axle 34 with the end portion 50 of the film being drawn from the cradle as previously described. Glass strand 71 is pulled from glass cake 70 and guided over tension bars 72 through the hollow center of cradle shaft 46. The glass strand then extends through the mounting block of the cradle and extends in the direction of the axis of rotation of cradle 24. The glass strand is directed past roll 35 and exits the cradle via the guide roller, tension bars, and guide bars previously described. Thus, as cradle 24 is rotated about axis 49, the film is twisted around the glass strand producing a single glass reinforced plastic strand which is pulled through the oven via drive means 22 (FIG. 3) mid eventually pelletized by pelletizer 23. It is possible to twist glass strand with sheet film in the embodiment shown in FIG. 1; however, several advantages are obtained by drawing the glass strand directly from the cake as shown in FIG. 5. These advantages include the elimination of preparation labor. In addition, the ability to pass the glass roving through liquid modifying agents such as organo-functional silanes or liquid colors before the strand reaches the film is possible when utilizing the cake. Such would permit the process to produce value added molding compounds as well as recycling scrap film.

Tension bars 40 and 41 for the embodiments of FIG. 1–5 are mounted to a pair of discs 18 each located inwardly of and mounted to members 30 and 31. Fasteners 17 secure discs 18 to members 30 and 31. Fasteners 17 may be loosened allowing discs 18 to be rotated to adjust the positions of bars 40 and 41. For example, in FIG. 5 bars 40 and 41 are shown as being approximately located at 2 o'clock and 8 o'clock respectively.

Figure 8:
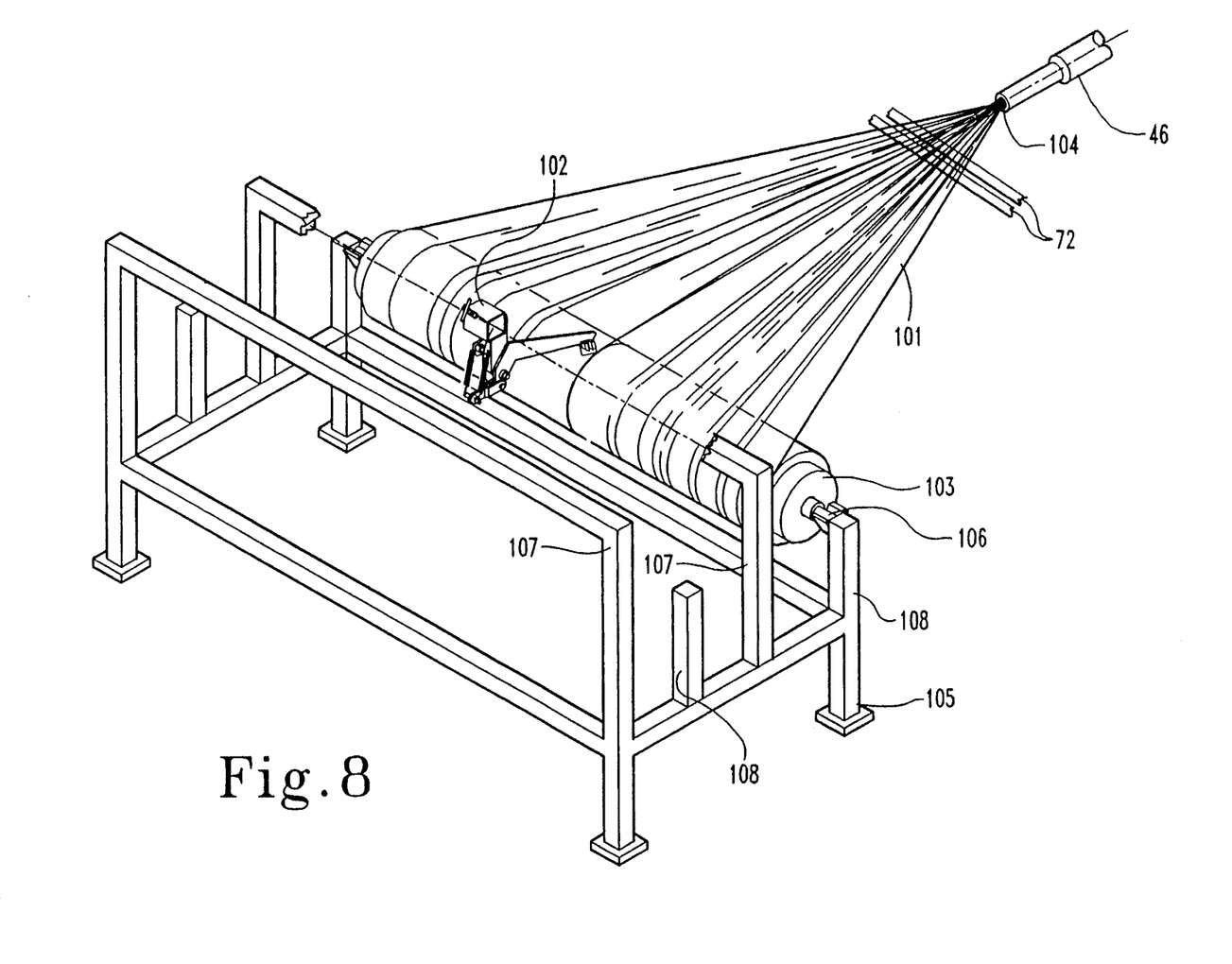
FIG. 8 is a perspective view of the film dispensing mechanism of the preferred embodiment of the present invention.
Figure 9:
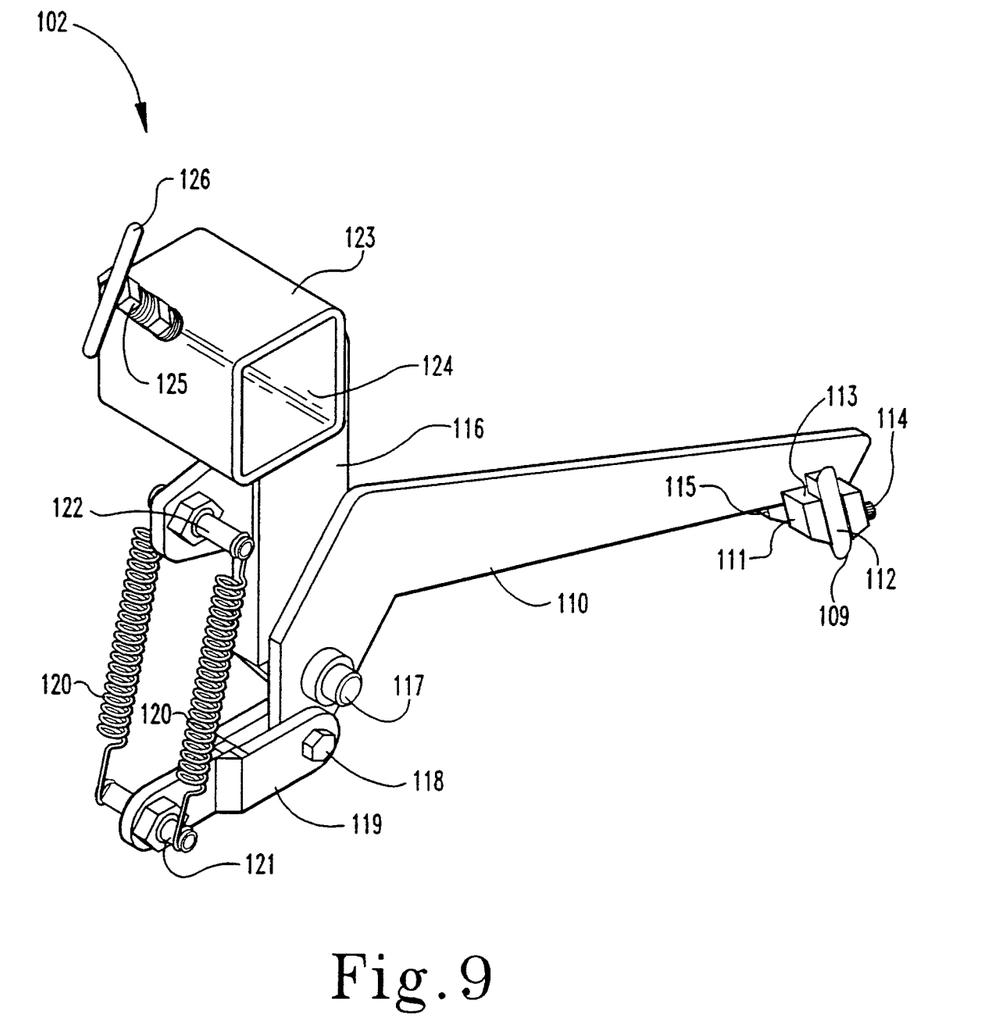
FIG. 9 is a perspective view of the film splitter employed in the preferred embodiment of the present invention.

In the preferred embodiment of the present invention, a second strand of film is used in place of glass strand 71. The apparatus for dispensing this film is illustrated in FIGS. 8 and 9. The embodiment of FIG. 8 is identical to that described above with the exception that film 101 is drawn through the hollow center of cradle shaft 46. A splitter assembly 102 is shown splitting the film into two portions as it is dispensed from second film roll 103. Splitting the film in this manner and feeding it through the hollow center of cradle shaft 46 causes the two sides of the film 101 to be twisted about one another as they travel through hollow center of cradle shaft 46. This twisting is illustrated at the mouth 104 of the hollow center of cradle shaft 46. It should be noted that film can be fed into the hollow center of cradle shaft 46 in a single piece in which case splitter assembly 102 would be unnecessary.

Splitter assembly 102, which is shown in more detail in FIG. 9, is mounted to frame 105 above second film roll 103. Second film roll 103 is also mounted to frame 105 by way of an axle 106. The frame illustrated in FIG. 8 includes provisions for the dispensing of multiple rolls of film 101. Thus, the frame as shown has two splitter arm mounting members 107 and two film roll dispensing members 108. The forward most splitter arm mounting member 107 and forward most dispensing member 108 are lower in elevation than the rearwardly located members 107 and 108. The forward most splitter arm rotating member 107 is shown in cutaway so, as to better illustrate splitter assembly 102 and second film roll 103.

Referring now to FIG. 9 there is shown in detail the splitter assembly 102. A sharpened metal blade 109 is secured to blade ann 110 by way of a blade clamp 111. Clamp 111 includes an upwardly facing and centrally extending slot receiving the distal end of blade arm 110 with a standard fastening device securing clamp 111 to blade arm 110. Blade 109 includes a longitudinal or cutting axis parallel to the longitudinal axis of blade arm 110 and is integrally connected to an upwardly extending blade key 112 removably extending into a recess 113 of blade clamp 111. The blade key 112 fits snuggly inside recess 113 in the blade clamp 111 and extends downwardly beneath clamp 111. A set screw 114 secures the blade key 112 to the blade clamp 111. Portion 115 of blade clamp 111 is disposed on the opposite side of blade arm 110 so as to provide an alternative securing location for a splitter blade having a blade key identical to key 112.

Blade 109 has cutting edges on both ends and can be rotated end to end as the cutting edge dulls. The square configuration permits the blade 109 to be switched from one side of blade clamp 111 to the other side of the blade clamp 115 depending upon which end of the film roll is being cut. This blade configuration allows the cutter to slit the film down to the roll core without binding or hanging up on that portion of the film roll that is not in use. Thus, as the cutter slits the roll into two portions on the opposite sides of the cutter, one portion of the roll on one side of the cutter may be unspooled from the roll while the remaining portion of the roll on the opposite side of the cutter may be retained on the roll.

Blade arm 110 is pivotally connected to ann support 116 by shoulder bolt 117. This arrangement allows the blade arm to pivot upwardly or downwardly so as to keep the blade 109 in constant contact with film roll 103. An ann link 119 is mounted by bolt 118 to an extension of arm 110 extending beneath bolt 117. A pair of retaining springs 120 are pivotally connected to blade arm link 119 by lower spring anchor 121. The placement of the springs in this manner causes an upward force to be exerted.on the blade arm link 119. This upward force results in a pivoting motion about shoulder bolt 117 which forces blade arm 110 to rotate clockwise as viewed in FIG. 9. The urging of blade arm 110 in a clockwise direction ultimately results in constant pressure being applied downwardly on blade 109. This pressure is necessary to ensure that the blade continues to cut through the film as it is unspooled from the reel and as the thickness of the film roll continually decreases.

The two springs 120 are secured to the arm support 116 by way upper spring anchor 122. The upper portion of ann support 116 is provided with a hollow frame mounting member 123. Opening 124 in frame mounting member 123 is sized to permit the splitter assembly 102 to slide along splitter arm mounting members 107 on the frame 105. A splitter securing screw 125 functions as a set screw to secure the splitter in the desired position. The end of splitter set screw 125 is provided with a knob 126 to allow manual tightening and releasing of the splitter set screw 125.

Figure 6:
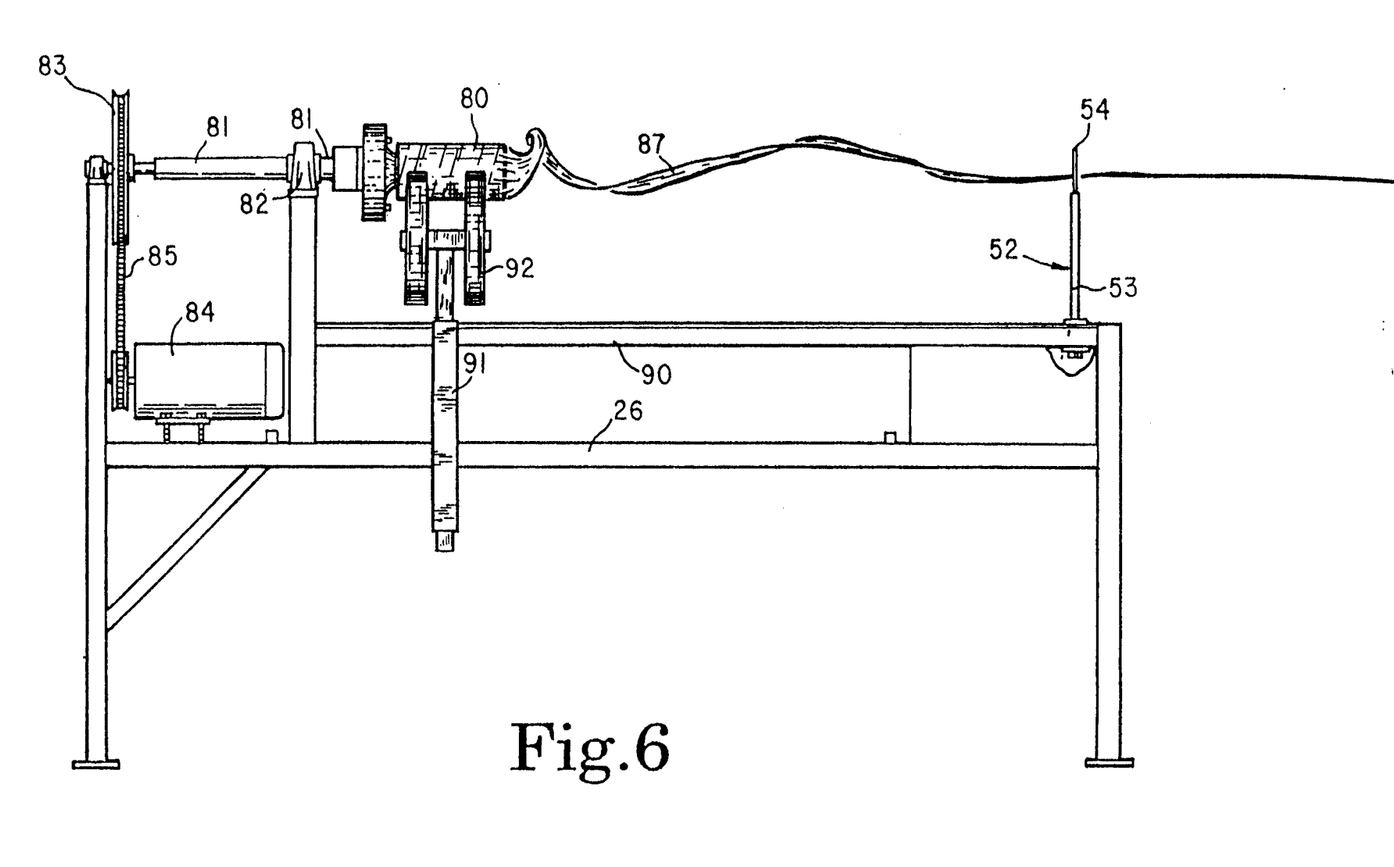
FIG. 6 is a side view of an alternate embodiment of the present invention showing the holder and twisting means.
Figure 7:
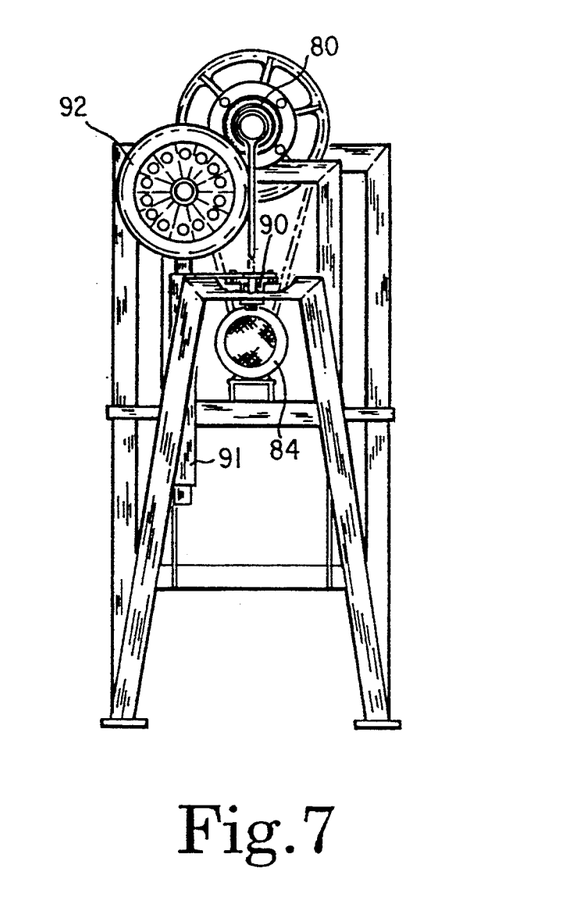
FIG. 7 is a fragmentary end view of the device of FIG. 6.

An additional alternate embodiment of the present invention is shown in FIGS. 6 and 7. The additional alternative embodiment is identical to the previously described alternate embodiment with the exception that cradle 24 is not utilized. Instead, the roll of film 80 is mounted to axle 81 in turn rotatably mounted by bearings 82 and drivingly connected to pulley wheel 83. The pulley wheel is rotated by means of a belt 85 driven by the output shaft of electric motor 84. The film 87 is axially pulled from roll 80 as roll 80 is rotated by axle 81. Roll 80 is removably mounted to axle 81 but rotates as a unit with the axle as it is rotated about its longitudinal axis. Thus, the distinguishing feature between the alternate embodiment shown in FIGS. 6 and 7 and the alternate embodiment shown in FIG. 1 is that the film is axially pulled from the spool in the embodiment of FIGS. 6 and 7 with the roll being rotated about its longitudinal axis whereas in the embodiment of FIG. 7 the film is pulled laterally from the roll in a direction perpendicular to the roll longitudinal axis and in the direction of the axis of rotation of the cradle. In both embodiments, the ring shaped film support 52 is mounted to the france thereby guiding the film to the oven, drive means and pelletizer.

In order to maintain tension on film 87 being pulled from roll 80, a pair of wheels 92 contact tile film on the roll. Wheels 92 are rotatably mounted to bracket 91 which in turn is removably mounted to frame 90. Conventional fastening devices are utilized to secure the wheel frame 91 to main frame 90. The wheels may be vertically adjusted and are spring biased against roll 80. The circumferential edge portions of wheels 92 contact the film on roll 80 thereby maintaining tension on the film as the film is pulled from the roll.

In order to optimize the production of pellets, best results have been obtained by varying the distance between ring guide 52 and the end of cradle 24 depending upon the type of material being twisted. Further, the distance between the radiant heaters 57 and the strand extending through the oven will affect the quality of the product. Best results have been obtained by spacing the heaters 57 apart from the strand a distance greater at the entrance of the oven as compared to the exit 97. Thus, bottom wall 55 is vertically fixed whereas the top wall 56 is movably mounted to the frame in order that wall 56 may be vertically adjusted relative to wall 55 and strand 53. The strand may be positioned approximately two inches above the bottom wall 55.

The location of the ring guide as well as the spacing of the floor and ceiling of the oven may be adjusted depending upon the type of material being twisted. These parameters will be determined by conducting a few pilot runs. A variety of factors including the color of the film, the extent of any printing on the film, thickness, width and film combinations all contribute to the production rate. The amount or type of colors along with the amount of print on the film dedicates the heat and speed requirements. Aluminum colored film will reflect heat while a film of a dark red or brown will absorb heat.

Many variations are contemplated and included in the present invention. For example, it is possible to process film in addition to polypropylene and polyethylene including polyester along with some saran/polypropylene layered film. The strand exiting the oven is shown as being fed to a pelletizer; however, it is understood the strand may be fed directly into an extruder or may be wound on a reel for storage in lieu of pelletizing same. The device mid method disclosed herein therefore can be used to not only change rolled film into pellets but also into strand which is then directly used or stored. The strand is composed of dense material as compared to the film in sheet form. The method for changing rolled film into dense material includes the steps of holding the roll of film, rotating the roll of film about an axis of rotation, pulling the film from the roll as the roll is rotated pureby twisting the film pulled therefrom into dense material as a strand, and then heating the strand. The density of the strand will vary depending upon the amount of twisting which in turn is a function of factors including the amount of rotation of the film and the rate of film withdrawal from the spool.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A device for producing pellets from recycled plastic film comprising:
   frame means for mounting components thereon;
   first holding means operable to rotatably hold a first roll of film, said first holding means having a longitudinal axis extending through said first roll to allow film to be unwound therefrom in a first direction;
   second holding means operable to rotatably hold a second roll of film, said second holding means operable to rotatably hold said second roll to allow film to be unwound therefrom in said first direction;
   a cradle rotatably mounted to said frame means operable to twist film as it's unwound from said first roll, said cradle having a cradle axis of rotation extending in said first direction, and having said first holding means mounted on said cradle with said longitudinal axis of said first holding means perpendicular to said cradle axis of rotation;
   guide means for feeding film from said second roll of film into said cradle in said first direction, said guide means directing said film from said second roll to a position adjacent and parallel to film unwound frown said first roll;
   first drive means for rotating said cradle wherein said film from said first roll of film is twisted about said film from said second roll of film to form a film strand;
   heating means operable to heat said strand;
   second drive means engagable with said strand and operable to move said strand through said heating means;
   pelletizing means receiving said strand and operable to pelletize same.

2. The device of claim 1 and further comprising:
   splitting means for splitting said film from said second roll into multiple sheets before said film from said second roll enters said cradle.

3. The device of claim 2 wherein said splitting means includes:
   a blade;
   retaining means for urging said blade against said film from said second roll; and
   adjusting means for positioning said blade widthwise along said film from said second roll.

4. The device of claim 3 wherein said retaining means includes a spring biased arm.

5. The device of claim 3 wherein said adjusting means includes a blade holder slideable on said frame means.

6. The device of claim 1 and further comprising:
   additional frame means for mounting a third holding means, said third holding means operable to rotatably hold a third roll of film to allow film to be unwound therefrom in said first direction wherein said film from said first roll of film is twisted about said film from said second roll and said film from said third roll to form said film strand.

7. A device for producing a plastic film strand comprising:
   frame means for mounting components thereon;
   first holding means operable to rotatably hold a first roll of film, said first holding means having a longitudinal axis extending through said first roll to allow film to be unwound therefrom in a first direction;
   second holding means operable to rotatably hold a second roll of film, said second holding means having a longitudinal axis extending through said second roll to allow film to be unwound therefrom in said first direction;
   a cradle rotatably mounted to said frame memos operable to twist film as it is unwound from said first roll, said cradle having a cradle axis of rotation extending in said first direction, and having said first holding means mounted on said cradle with said longitudinal axis of said first holding means perpendicular to said cradle axis of rotation;
   guide means for feeding film from said second roll of film into said cradle in said first direction, said guide means directing said film from said second roll to a position adjacent and parallel to film unwound from said first roll; and
   first drive means for rotating said cradle wherein said film from said first roll of film is twisted about said film from said second roll of film to form a film strand.

8. The device of claim 7 and further comprising:
   splitting means for splitting said film from said second roll into multiple sheets before said film from said second roll enters said cradle.

9. The device of claim 8 wherein said splitting means includes:
   a blade;
   retaining means for urging said blade against said film from said second roll; and
   adjusting means for positioning said blade widthwise along said film from said second roll.

10. The device of claim 9 wherein said retaining means includes a spring biased arm.

11. The device of claim 9 wherein said adjusting means includes a blade holder slideable on said frame means.

12. The device of claim 7 and further comprising:
    additional frame means for mounting a third holding means, said third holding means operable to rotatably hold a third roll of film to allow film to be unwound therefrom in said first direction wherein said film from said first roll of film is twisted about said film from said second roll and said film from said third roll to form said film strand.

* * * * *